United States Patent
Anquet et al.

(10) Patent No.: US 9,081,724 B2
(45) Date of Patent: Jul. 14, 2015

(54) METHOD AND DEVICE FOR PROTECTING MEMORY CONTENT USING FIRST AND SECOND ADDRESSABLE STORAGE REGIONS AND FIRST AND SECOND ENCRYPTION KEYS

(75) Inventors: Nicolas Anquet, Grenoble (FR); Hervé Sibert, Le Mans (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 11 days.

(21) Appl. No.: 13/639,551

(22) PCT Filed: Apr. 6, 2011

(86) PCT No.: PCT/EP2011/055382
§ 371 (c)(1),
(2), (4) Date: Oct. 5, 2012

(87) PCT Pub. No.: WO2011/124625
PCT Pub. Date: Oct. 13, 2011

(65) Prior Publication Data
US 2013/0036312 A1      Feb. 7, 2013

Related U.S. Application Data

(60) Provisional application No. 61/372,203, filed on Aug. 10, 2010.

(30) Foreign Application Priority Data

Apr. 9, 2010   (EP) ................................. 10305374

(51) Int. Cl.
*G06F 11/30*    (2006.01)
*G06F 12/14*    (2006.01)
(Continued)

(52) U.S. Cl.
CPC .......... *G06F 12/1408* (2013.01); *G06F 21/602* (2013.01); *G06F 21/78* (2013.01)

(58) Field of Classification Search
CPC ................... G06F 21/80; G06F 21/60–21/79; G06F 2221/2107; G06F 12/14–12/1441
USPC ......................................... 713/189, 190–194
See application file for complete search history.

(56) References Cited

U.S. PATENT DOCUMENTS 4,473,878 A * 9/1984 Zolnowsky et al. .......... 711/208
4,996,639 A * 2/1991 Ishimoto et al. ............. 712/242
(Continued)

FOREIGN PATENT DOCUMENTS

| EP | 1 207 462 A2 | 5/2005 |
|---|---|---|
| WO | 03/027816 A1 | 4/2003 |
| WO | 2009/105011 A1 | 8/2009 |

OTHER PUBLICATIONS

International Search Report issued in corresponding International application No. PCT/EP2011/055382, mailing date May 23, 2011.
(Continued)

*Primary Examiner* — Christopher Revak
*Assistant Examiner* — Vadim Savenkov
(74) *Attorney, Agent, or Firm* — Patent Portfolio Builders PLLC

(57) ABSTRACT

A method of protecting digital data stored in a storage medium. The method comprises providing a first and a second addressable storage region in the storage medium, and selector means for selectively indicating one of the first and the second addressable storage regions as active; storing the digital data in the first addressable storage region of the storage medium, wherein the digital data stored in the first addressable storage region is stored encrypted with a first encryption key; and causing the selector means to indicate the first addressable storage region as being active; and, responsive to a trigger event, copying the digital data from the first to the second addressable storage region, wherein the digital data stored in the second addressable storage region is stored encrypted with a second encryption key; and causing the selector means to indicate the second addressable storage region as being active.

19 Claims, 2 Drawing Sheets

(51) Int. Cl.
*G06F 21/78* (2013.01)
*G06F 21/60* (2013.01)

(56) References Cited

U.S. PATENT DOCUMENTS

| | | | |
|---|---|---|---|
| 5,825,888 A * | 10/1998 | Kimura et al. | 380/270 |
| 7,889,862 B2 * | 2/2011 | Dellow et al. | 380/44 |
| 8,234,506 B2 * | 7/2012 | Hajji et al. | 713/193 |
| 8,286,238 B2 * | 10/2012 | Durham et al. | 726/22 |
| 2003/0041220 A1 * | 2/2003 | Peleska | 711/162 |
| 2003/0126434 A1 | 7/2003 | Lim et al. | |
| 2003/0217247 A1 * | 11/2003 | Abramovitz et al. | 711/173 |
| 2005/0114686 A1 | 5/2005 | Ball et al. | |
| 2008/0240428 A1 | 10/2008 | Hobbet et al. | |
| 2009/0144349 A1 * | 6/2009 | Phillips et al. | 707/206 |
| 2010/0106920 A1 * | 4/2010 | Anckaert et al. | 711/154 |
| 2010/0146303 A1 * | 6/2010 | Kothari et al. | 713/193 |
| 2011/0296238 A1 * | 12/2011 | Abzarian et al. | 713/189 |

OTHER PUBLICATIONS

International Preliminary Report on Patentability issued in corresponding International application No. PCT/EP2011/055382, on Oct. 9, 2012.

Anonymous, "OpenBSD Encrypted Virtual Filesystem Mini-HOWTO", XP002357734, Retrieved from the Internet: URL:http:jjweb.archive.orgjweb/20041011194619/http://www.backwatcher.org/, writingjhowtosjobsd-encrypted-filesystem.html, Dec. 6, 2005.

* cited by examiner

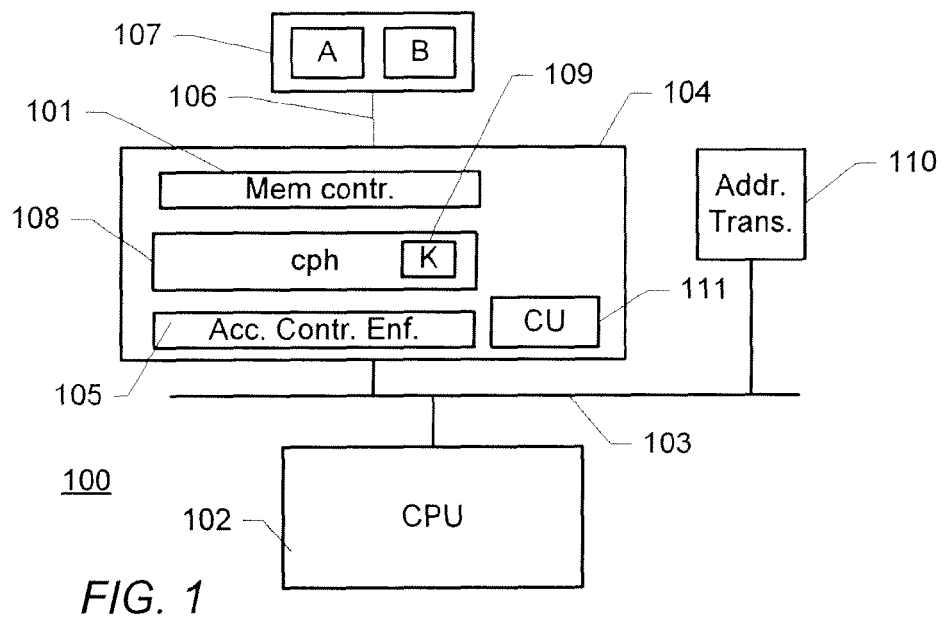
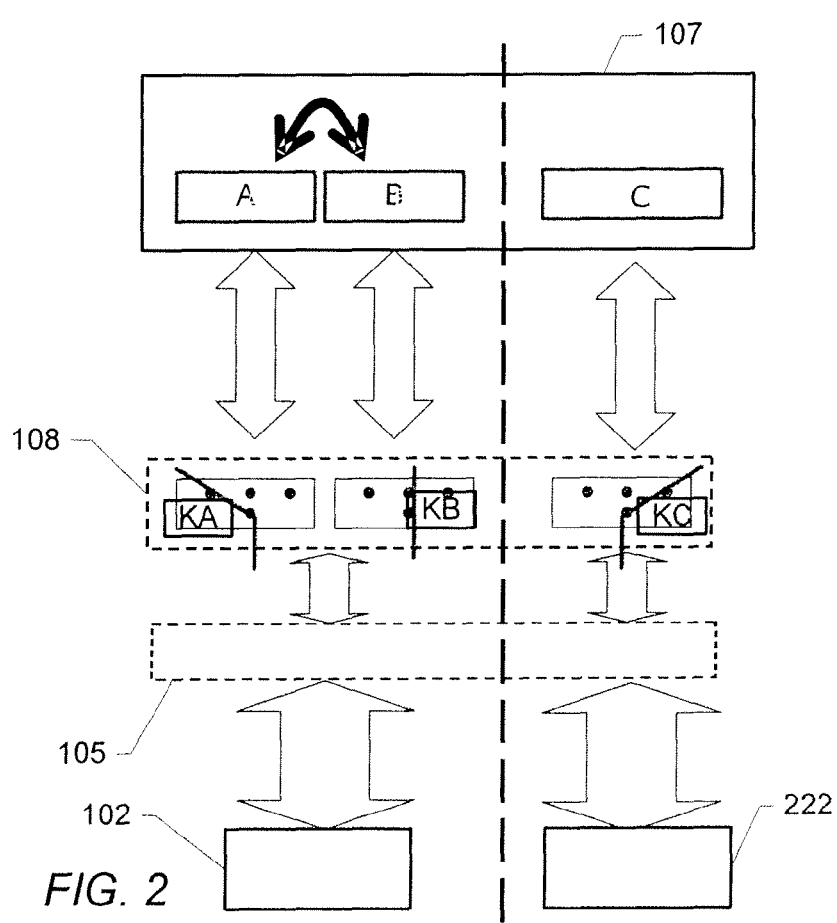
FIG. 1
FIG. 2 though the decrypted data was originally encrypted when stored in a storage medium. The first, second, and further storage regions may be respective memory regions of the same physical storage medium, such as a DDR memory. Alternatively, the different storage regions may refer to different storage media, such as different memory modules or even different types of storage media.

METHOD AND DEVICE FOR PROTECTING MEMORY CONTENT USING FIRST AND SECOND ADDRESSABLE STORAGE REGIONS AND FIRST AND SECOND ENCRYPTION KEYS

TECHNICAL FIELD

Disclosed herein are a method, product means, and a device for protecting digital data stored in a storage medium.

BACKGROUND

In many situations it is desirable to protect memory content against unauthorised access. Encryption of data stored in a memory or other storage medium is a widely used method for achieving such a protection. There are a large variety of known encryption methods providing different degrees of protection against attacks by unauthorised users targeted at breaking the encryption and getting access to the data.

However, secure encryption algorithms such as those defined in the Advanced Encryption Standard (AES) may not meet latency requirements when used for protecting memory content of memory types such as DDR. In many applications latency constraints may impose the choice of less secure but very low-latency encryption schemes such as scrambling techniques that operate on byte level, i.e. replace each byte data by a scrambled byte based on a scrambling key.

Furthermore, even when memory content of a processing device is encrypted with a secure algorithm such as AES, the processing device may still be vulnerable to a number of possible attacks, in particular in the case of storage media whose contents may be written several times during execution. Examples of such attacks include statistical attacks, replay attacks, substitution attacks that can be replayed.

It is thus generally desirable to provide protection of data stored in a storage medium with a low degree of vulnerability to attacks such as statistical attacks.

SUMMARY

Disclosed herein are a method and a processing device for protecting digital data stored in a storage medium.

Embodiments of the method disclosed herein comprise:

providing a first and a second addressable storage region in the storage medium, and selector means for selectively indicating one of the first and the second addressable storage regions as being active;

storing the digital data in the first addressable storage region of the storage medium, wherein the digital data stored in the first addressable storage region is stored encrypted with a first encryption key; and causing the selector means to indicate the first addressable storage region as being active;

responsive to a trigger event copying the digital data from the first to the second addressable storage region, wherein the digital data stored in the second addressable storage region is stored encrypted with a second encryption key; and causing the selector means to indicate the second addressable storage region as being active.

Hence, the storage medium comprises at least two secure regions that have associated different respective encryption keys. The regions are accessible by a secure processing unit that is protected against software attacks such that a user (e.g. another, non-secured system) external to the secure system is prevented from accessing the plain data stored in the two secure regions but can only access the encrypted data. For example, if the processing device includes a non-secure processing unit that can access the same storage medium, the processing device may comprise a hardware access control that prevents software attacks from this non-secure system by preventing the non-secure system from reading the plain, i.e. decrypted, content of the first and second storage regions, and from writing plain data determined by the non-secure system to the first or second storage regions. For example, a non-secure system may be prevented from reading the plain text by reserving, on a System-on-a-Chip device, an embedded memory region that cannot be accessed by any non-secure system. This may be enforced by hardware, e.g. by detecting a hardware flag indicating the source of the access request: secure or non-secure. Similarly, a non-secure system may be prevented from writing plain data determined by the non-secure system to the first or second storage regions. For example, before going through the memory controller, an access control logic may look after the above hardware flag indicating the source of the access request (secure or non-secure), and deny the writing in case the source of the request is from the non-secure system.

At each point in time during normal operation of the processing device, no more than one of the two regions is marked as "active" or "In use". The marking as being "active" or "in use" causes read commands requesting at least a part of the digital data to cause the requested data to be read from the region marked as "active" or "in use". Hence, the region marked as active is the region from which digital data is read, while write commands cause digital data to be written to at least the active region.

It will be appreciated that the storage medium may include additional storage regions for storing other digital data, including non-secure regions and/or regions whose content may also be encrypted, but with encryption keys different from the encryption keys used for the first and second regions. In some embodiments the method may comprise providing a third addressable storage region; and wherein the method comprises storing static data in the third addressable storage medium; wherein the static digital data stored in the third addressable storage region is stored encrypted with a third encryption key; and wherein the digital data stored in the first and second addressable storage regions is dynamic data. Hence, in some embodiments, the system manages three keys for securing secure regions of the memory: one key for a region where data does not change often, and two keys for swapping/rekeying regions with data that changes often. Hence, the terms static data refers to data that is known or expected at write time to never change or at least not to change frequently, while the term dynamic data refers to data that is known or expected at write time to change frequently, i.e. more frequently than the static data. It will be appreciated that in some embodiments the method may base the decision whether to store a certain data item in the first and second or in the third region on a comparison of the known or expected frequency of change of the data with a predetermined threshold, such that data that is known or expected to change more frequently than a predetermined threshold frequency is stored in the first and second regions.

The trigger event may be any suitable trigger event, e.g. created by a timer, a control process, a random number generator, etc.

Hence, in some embodiments, each time a trigger event triggering the re-encryption of the digital data is detected by the processing device, the data is copied from the storage region currently marked active to the storage region currently marked inactive, thus causing the data to be decrypted with the encryption key associated with the currently active region, and then re-encrypted with a different encryption key associated with the currently inactive region. The active region is marked inactive and the inactive region is marked active. Subsequently, the encryption key for the now inactive region may be renewed, e.g. by selecting a new random key. Hence, at the next occurrence of the trigger event, the data may be swapped back to the now inactive region causing the data to be re-encrypted with a new key.

Consequently, the digital data is periodically re-encrypted with a new encryption key, thereby making the data less vulnerable to attacks such as statistical attacks, replay attacks, substitution attacks that can be replayed.

Furthermore, embodiments of the method described herein do not rely on the security of the encryption algorithm used to encrypt the data, thus enabling low-latency scrambling algorithms for protecting the data. Embodiments of the method described herein prevent statistical attacks based on the observation of the data written at a fixed location at different points in time, even if the scrambling is very simple.

Accordingly, in some embodiments, the digital data stored in the first addressable storage region encrypted with a first encryption key is encrypted by scrambling the digital data with a scrambling key derived from the first encryption key, and the digital data stored in the second addressable storage region encrypted with a second encryption key is encrypted by scrambling the digital data with a scrambling key derived from the second encryption key. The scrambling keys may be derived from the respective encryption keys by selecting the scrambling key to be equal to the corresponding encryption key or by deriving the scrambling keys as a different function of at least the corresponding encryption key. Hence, some embodiments of the method meet stringent latency/hardware requirements, allowing bytes (or another unit of data depending on the granularity of the read/write process) to be readable/writable separately, while still protecting against the above attacks.

Hence embodiments of the method may use a weak byte-encryption algorithm to scramble the storage regions, e.g. by performing a permutation of each byte, where the permutation is determined by the byte address and a scrambling key. However, statistical attacks are still prevented, because for each byte, different permutations are used at different points in time.

In some embodiments, the digital data stored in the first addressable storage region encrypted with a first encryption key is encrypted by encrypting each byte of the digital data (or other suitable unit of digital data) using an encryption key determined from the first encryption key and an address of the byte in the first addressable storage region, and the digital data stored in the second addressable storage region encrypted with a second encryption key is encrypted by encrypting each byte of the digital data (or other suitable unit of digital data) using an encryption key determined from the second encryption key and an address of the byte in the second addressable storage region.

Nevertheless, e.g. in applications where latency is not a concern, embodiments of the method may also be implemented with a full-fledged encryption algorithm such as AES.

Some embodiments of the method may use a weak stream-oriented encryption algorithm. In order to be able to write bytes separately, the scrambling algorithms may be a stream cipher generating encryption masks depending on addresses; the data may be XORed to the masks. Thus, for each given byte-address, the encryption is just a permutation dependent on the address. When the encryption mask is changed when the data is copied between the first and second regions, discovery of the permutation is prevented.

Embodiments of the method described herein provide a protection mechanism that is transparent for application code and/or data that executes in the protected regions.

It is a further advantage that the method may be easily combined with other encryption schemes, e.g. for protection of other parts of the storage medium without risking leakage of the first and second encryption keys, even if encryption keys for encrypting the other parts of the storage medium are found by an unauthorised user.

In some embodiments, a memory management unit is provided for managing an addressable logical region that is selectively mappable to either the first or the second addressable storage region. Hence, the method disclosed herein may be implemented by using existing hardware components.

In some embodiments of the method disclosed herein, at each point in time during normal operation of the processing device, either the first or the second addressable storage region is selected as active and the corresponding other addressable storage region as inactive; and the method comprises, responsive to a trigger event, performing the following steps:

optionally mirroring write commands to both the first and the second addressable storage regions;
 causing read commands to read data from the active addressable storage region;
 determining a new encryption key for the inactive addressable storage region;
 copying the digital data from the active to the inactive addressable storage region, including encrypting the digital data with the new encryption key;
 causing the selector means to indicate the inactive addressable storage region as being active and the active addressable storage region as being inactive.

It is an advantage of some embodiments of the method disclosed herein that the method is transparent to the scheduling of the system that uses the protected regions.

In some embodiments each of the first and second encryption keys is determined by a random-number generator.

In some embodiments, at each point in time during normal operation of the processing device, either the first or the second addressable storage region is selected as active and the corresponding other addressable storage region as inactive; and the method comprises, responsive to a trigger event, performing the following steps:

determining a new encryption key for the inactive addressable storage region;
 halting execution of processes executed on the processing device dependent on digital data stored in the active storage region;
 copying said digital data from the active to the inactive addressable storage region, including encrypting said digital data with the new encryption key;
 causing the selector means to indicate the inactive addressable storage region as being active and the active addressable storage region as being inactive;
 resuming execution of processes executed on the processing device dependent on said digital data.

For the purpose of the present description the term digital data is intended to comprise any one or more digital data items stored in a storage medium, where the data item may include computer-executable instructions and/or other types of computer-executable code, and/or any type of other information, e.g. text, an image, multimedia content, database content, operational parameters of the processing device, and/or the like.

For the purpose of the present description, the term halting is intended to comprise stalling the execution, i.e. the automatic suspension by hardware of the execution of the code and/or the fetching of data.

The present invention relates to different aspects including the method and processing device described above and in the following, corresponding methods, apparatus, and computer programs, each yielding one or more of the benefits and advantages described in connection with the above-mentioned processing device, and each having one or more embodiments corresponding to the embodiments described in connection with the above-mentioned method and/or processing device.

The term processing device is intended to comprise any electronic device comprising processing means for data processing. In particular, the term processing device is intended to comprise any electronic equipment, portable radio communications equipment, and other handheld or portable devices, and integrated circuits, microprocessors, chips or chipsets for use in such equipment.

The term portable radio communications equipment includes all equipment such as mobile terminals, e.g. mobile telephones, pagers, communicators, electronic organisers, smart phones, personal digital assistants (PDAs), handheld computers, or the like.

The term storage medium is intended to include any circuitry or device suitable for storing digital data items. Examples of such storage media include non-volatile memory, a random access memory (RAM), a flash memory, an Erasable Programmable Read-Only Memory (EPROM), a double data rate (DDR) memory, NOR memory, executable memory, or the like. In some embodiments, the storage medium is included in the processing device, while in other embodiments the storage medium is external to the processing device but connectable to the processing device in data communication connection, e.g. via a wired or wireless connection.

It is noted that the features of the methods described herein may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

Hence, according to another aspect, a computer program comprises program code means adapted to cause a data processing device to perform the steps of the method described herein, when said computer program is run on the data processing device. For example, the program code means may be loaded in a memory, such as a RAM (Random Access Memory), from a storage medium or from another computer via a computer network. Alternatively, the described features may be implemented by hardwired circuitry instead of software or in combination with software.

BRIEF DESCRIPTION OF THE DRAWINGS

The above and other aspects will be apparent and elucidated from the embodiments described with reference to the drawing in which:

FIG. 1 shows a schematic block diagram of an embodiment of a processing device.

FIG. 2 schematically shows a functional block diagram of another embodiment of a processing device.

DETAILED DESCRIPTION

Figure 3:
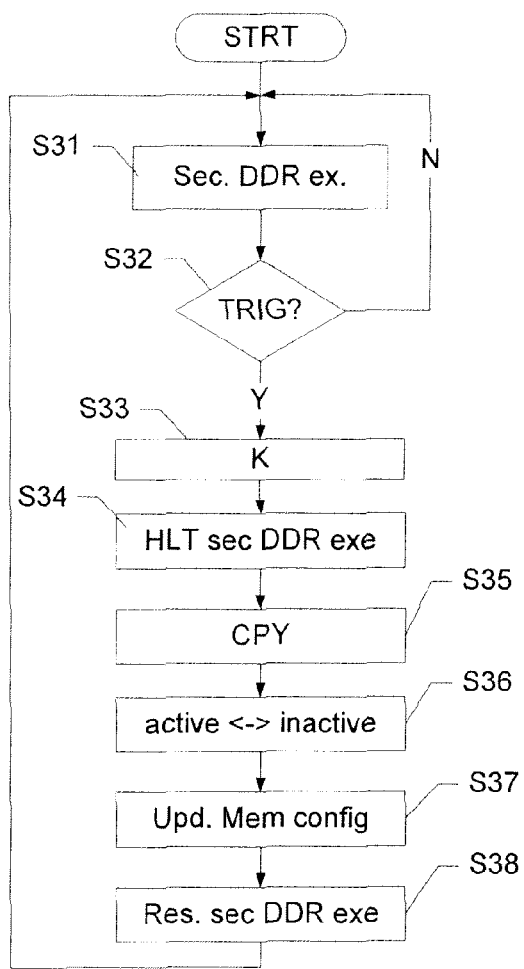
FIG. 3 shows a flow diagram of an embodiment of the re-scrambling and copy process.

FIG. 1 shows a schematic block diagram of a processing device, e.g. in the form of an Integrated Circuit for example for use in a mobile terminal or any other electronic equipment. The processing device, generally designated 100, comprises a central processing unit 102, a memory 107, and a memory subsystem 104 comprising a digital circuit for responsible for handling access to the memory 107 requested by the central processing unit (CPU) 102 and/or one or more other processing unit(s). The functions of the memory subsystem 104 may include some or all of the following: translation of virtual addresses to physical addresses (i.e., virtual memory management), memory protection, cache control, bus arbitration, and/or the like.

The central processing unit (CPU) 102 may comprise a programmable microprocessor and/or other logic circuitry suitable for controlling the operation of a mobile terminal or other electronic equipment, e.g. by executing program code.

The central processing unit 102 is connected to the memory subsystem 104 via a system bus 103 or via another suitable interface for exchanging data. The memory subsystem 104 is connected via a memory interface 106 with the memory 107.

The memory subsystem 104 comprises or is connected to a memory controller 101 comprising digital circuitry which manages the flow of data going to and from the memory 107. The tasks of the memory controller 107 may include receiving an address, a direction (read or write), and the actual data, and reading/writing the data to/from the external memory 107. Details of how the memory should be accessed, such as timing, may be taken care of by the memory controller.

The processing device further comprises a memory management unit 110 or other address translation block for translating virtual addresses to physical addresses of the memory 107 (i.e. virtual memory management) and optionally one or more other memory/memories.

The memory 107 may be a random access memory (RAM), such as a double data rate (DDR) RAM, or another type of memory. The memory 107 may be an internal or external memory. The memory 107 may be shared by more than one processing unit. Consequently, data stored on the external memory 107 may be particularly vulnerable to unauthorised access.

In order to protect at least some of the data stored in the memory 107 against unauthorised access, the memory subsystem comprises a control unit 111, an access control enforcement block 105 and a cipher block 108. The cipher block includes a secret key block 109 for generating at least two sets of secret keys, e.g. based on a single root key or based on a respective root key for each set of secret keys. The memory comprises two regions, designated A and B, access to which is limited by the access control enforcement block 105 to the central processing unit 102. The central processing unit 102 is implemented as a secure system. For example, the processing unit may comprise a hardware mechanism for informing the target (for example the DDR controller) that it is a secure system (e.g. a hardware flag carried over the interconnect). Only a CPU that is involved in security would have its hardware flag set indicating that it belongs to the secure system. In other words, a non-secure software cannot fool the hardware and make it position this hardware flag as "secure," if it is not authorized. The cipher block 108 causes the data stored in regions A and B to be scrambled with different respective scrambling keys generated by the secret key block 109. Hence, the secret key block is adapted to generate at least two different sets of secret keys, $K_A$ and $K_B$, respectively. It will be appreciated that alternatively the data in regions A and B may be protected by another suitable encryption mechanism different from scrambling, e.g. another key-based encryption algorithm. The choice of encryption scheme may be governed by latency and security requirements. The memory subsystem 104 implements a protection mechanism for protecting the data stored in the memory 107 by periodically changing the scrambling key for the data stored in regions A and B, as will be described in more detail below. The copying and re-scrambling operation is controlled by the control unit 111.

It is understood that the processing device may include additional blocks such as additional memory blocks or storage devices, controllers, additional processing units, interface units, etc. Hence, the memory subsystem may manage access to additional memory blocks in addition to memory 107, e.g. to internal RAM and/or external memory. Similarly, the different functional blocks described above may be combined into physical hardware entities in different ways. For example, the memory controller may be implemented as a separate unit, or the memory subsystem and/or the memory controller may be included into the CPU. Alternatively, or additionally, in an alternative embodiment, the control unit 111 may be included in the CPU 102, and/or the function of the control unit 111 may be performed by the CPU 101. Furthermore, the functional blocks of the memory subsystem may be implemented in a different way, e.g. divided into respective hardware blocks in different ways. For example, the access control enforcement block and/or the cipher block may be implemented as a part of the memory controller.

There may further be one or more non-secure system(s) that can access the same memory, as illustrated in FIG. 2. In this case, the access control block 105 prevents such non-secure systems from reading the plain content of regions A and B and from triggering the writing of chosen plaintext to regions A or B. FIG. 2 schematically shows a functional block diagram of an embodiment of a processing device wherein the memory 107 comprises secure regions A and B accessible by a secure system 102, e.g. a secure CPU or a CPU operating in a secure mode. The memory 107 further comprises region C accessible by non-secure system 222, e.g. a different CPU or the CPU 102 operating in a non-secure mode of operation.

Access to regions A and B is provided by the access control enforcement block 105 which limits access to regions A and B to the secure system 102.

Access to region C is also provided by the access control enforcement block 105. However in this case, the non-secure system 222 is also granted access.

The cipher block 108 provides scrambling and descrambling of the scrambled data. To this end, the cipher block selects the correct scrambling key depending on which region is accessed. In particular, the data stored in region C may also be scrambled but with a scrambling key $K_C$ different from the scrambling keys used for regions A and B. Hence, the cipher block generates different key sets for the different regions. The various key sets are initialized and maintained by the memory subsystem or by the secure CPU 102, e.g. based on one or more root key(s) stored in the memory subsystem 104.

Similarly, the programming of the access control enforcement block 105 is performed by the secure CPU 102 only. The programming may include initializing the memory ranges dedicated to the secure and non-secure areas, i.e. initializing address boundary registers.

The interface to the memory subsystem 104 detects whether received memory access requests are from a secure CPU or not. Based on this information, the access control enforcement block controls access to the secure regions A and B. The interface may be composed of memory ports toward interconnect and memory ports toward the memory controller IP. The detection as to whether a received memory access request is from a secure CPU or not may be based on a hardware flag identifying that this specific access is issued from a secure system resource (e.g. CPU 102). The hardware flag may be carried through the interconnect, sticking to the access request.

Operation of these blocks will now be described in more detail with continued reference to FIGS. 1 and 2.

At any given point in time, the control unit 111 marks one of the regions A and B as "in use" or "active", i.e. all read requests for data secured by the method described herein cause the memory subsystem to read the data from the region currently marked as "active". For example, the marking as active may be implemented by the address translation block 110, by translating the corresponding logical addresses to physical addresses in the active region.

Upon one or more trigger events (e.g. timer, process decision, etc.), the cipher block 108 selects a new scrambling key for the region currently not in use (e.g. for region B if region A is marked as "active"). For example, the cipher block may generate a new scrambling key as a random number. Subsequently, the contents of the region in use (e.g. region A) are copied to the other region (e.g. region B). Subsequently, the region to which the data was copied (e.g. region B) is marked as active instead of the region that was marked active when the trigger event occurred (e.g. region A). Hence, responsive to the trigger event the memory contents are copied from the active to the inactive region, and re-scrambled with a new key. The above operation, i.e. the selection of the new scrambling key, the copying of the data, and the swapping of the active and inactive regions, are controlled by the control unit 111.

FIG. 3 shows a flow diagram of an embodiment of the re-scrambling and copy process.

In step S31, the memory subsystem 104 provides secure memory access to a secure system. To this end, the memory subsystem has marked one of the secure management regions A and B as being active. The address translation block 110 provides a memory configuration wherein one logical address region is mapped either to memory A or B, e.g. using a suitable translation table entry.

In step S32, the control unit 111 of the memory subsystem checks whether a trigger event for triggering the re-scrambling process has occurred (e.g. a timer or command from a monitoring process). If such a trigger event has occurred the process continues at step S33; otherwise the process returns to steps S31 and continues secure memory execution.

In step S33, the cipher block 108 generates a new scrambling key for the inactive region, e.g. by drawing a random number.

In subsequent step S34, the execution using the secure regions of memory 107 is halted.

In subsequent step S35, the control unit 111 causes the memory subsystem 104 to copy the memory contents from the active region to the inactive region. The copy process includes a re-scrambling of the data, e.g. a byte-by-byte re-scrambling, wherein the data is de-scrambled using the scrambling key associated with the active region as part of the read operation, and the data is scrambled using the scrambling key associated with the inactive region as part of the subsequent write operation.

In subsequent step S36, the control unit 111 of the memory subsystem 104 marks the currently inactive region "active", and the currently active region "inactive".

In step S37, the address translation block 110 updates the memory configuration, e.g. by modifying a corresponding translation table entry so as to map the logical address space of the secure memory region to the new active memory region.

In subsequent step S38, the control unit 111 causes the memory subsystem to resume the execution of the secure memory regions; and the process returns to step S31.

It will be appreciated that the order of some of the above steps may be interchanged, e.g. step S33 may be performed after step S34. It will be appreciated that, in an alternative embodiment, the swapping/rekeying described herein may be performed partly or completely by software. The only hardware that may be required includes access control address boundary registers and scrambler key registers.

Figure 4:
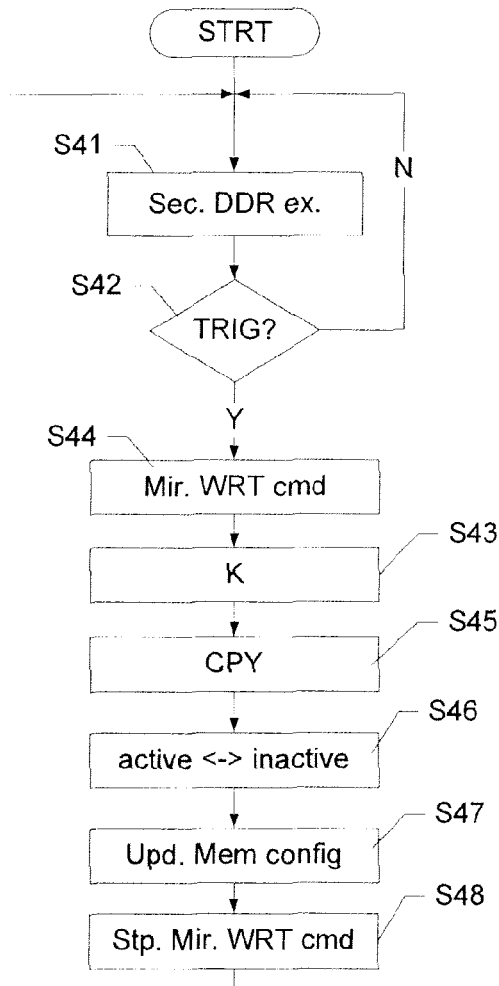
FIG. 4 shows a flow diagram of another embodiment of the re-scrambling and copy process.

FIG. 4 shows a flow diagram of another embodiment of the re-scrambling and copy process. The process of FIG. 4 is transparent to the scheduling of the system that uses the secure memory regions.

In step S41, the memory subsystem 104 provides secure memory access to a secure system. To this end, the memory subsystem has marked one of the secure management regions A and B as being active. The address translation block 110 provides a memory configuration wherein one logical address region is mapped either to memory A or B, e.g. using a suitable translation table entry.

In step S42, the control unit 111 of the memory subsystem checks whether a trigger event for triggering the re-scrambling process has occurred (e.g. a timer or command from a monitoring process). If such a trigger event has occurred the process continues at step S44; otherwise the process returns to steps S41 and continues secure memory execution.

In step 44, the control unit 111 of the memory subsystem causes the memory controller 101 to mirror subsequent write commands to both regions A and B, while read commands always read from the active region. It will be understood that the mirrored write commands cause the data to be written to region A scrambled with the scrambling key $K_A$ associated with that region and to region B scrambled with the scrambling key $K_B$ associated with that region.

In step S43, the cipher block 108 generates a new scrambling key for the inactive region, e.g. by drawing a random number.

In subsequent step S45, the control unit 111 causes the memory subsystem 104 to copy the memory contents from the active region to the inactive region. The copy process includes a re-scrambling of the data, e.g. a byte-by-byte re-scrambling, wherein the data is de-scrambled using the scrambling key associated with the active region as part of the read operation, and the data is scrambled using the scrambling key associated with the inactive region as part of the subsequent write operation. The control unit 111 of the memory subsystem ensures that, when a word (or other unit of data) is copied from the active to the inactive region, the copy operation does not interleave with other write commands to the same address. Hence, in embodiments where the copy operation is performed by hardware, execution may continue, reading from the currently/formerly active region, and writing to both regions simultaneously, until the copy is finished and the inactive region can become the active one. Duplicate copies ensure that data in the new active region are consistent.

In subsequent step S46, the control unit 111 of the memory subsystem 104 marks the currently inactive region "active", and the currently active region "inactive".

In step S47, the address translation block 110 updates the memory configuration, e.g. by modifying a corresponding translation table entry so as to map the logical address space of the secure memory region to the new active memory region.

In subsequent step S48, the control unit 111 of the memory subsystem causes the memory controller 101 to stop the mirroring of subsequent write commands to both regions A and B, i.e. both write and read commands address the new active region. Subsequently, the process returns to step S41.

It will be appreciated that in an alternative embodiment, the mirroring of write commands to both regions A and B may always be enabled rather than only during the copy and re-scramble operation. Alternatively or additionally, the order of some of the above steps may be changed. For example, the order of steps S44 and S43 may be changed.

Hence, interesting features of the embodiments described above include
- secured memory regions to which only secure access by a trusted/secure system is allowed,
- a cipher block that selects, for each read/write access, respective scrambling keys associated with respective regions of the memory;
- the switching between two secure memory regions and re-keying.

Although some embodiments have been described and shown in detail, the invention is not restricted to them, but may also be embodied in other ways within the scope of the subject matter defined in the following claims.

In particular, the embodiments have mainly been described with reference to a mobile terminal as an example of a data processing device. For example, the invention enables using DDR (instead of limited size internal RAM) for executing sensitive services, which is crucial on low-end devices such as 3G low-end mobile platforms with small internal RAM footprint. It is understood, however, that the method, product means, and device described herein may also be applied to other data processing devices.

Furthermore, the invention has mainly been described with reference to external memory, in particular external DDR. However, it will be appreciated that the invention is not limited to external memory and/or DDR, but may also be applied to other types of both internal and external memory.

The method, product means, and device described herein can be implemented by means of hardware comprising several distinct elements, and/or partly or completely by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claim is:

1. A method of protecting digital data stored in a storage medium, the method being performed in a processing device and comprising:
   providing a first and a second addressable storage region in the storage medium, and selector means for selectively indicating one of the first and the second addressable storage regions as active;
   storing the digital data in the first addressable storage region of the storage medium, wherein the digital data stored in the first addressable storage region is stored encrypted with a first encryption key; and causing the selector means to indicate the first addressable storage region as being active; and
   responsive to a trigger event causing the selector means to indicate the first addressable storage region as being inactive and the second addressable storage region as being active; causing the digital data stored in the first addressable storage region to be decrypted with the first encryption key; and copying all the decrypted digital data from the first to the second addressable storage region, wherein the digital data stored in the second addressable storage region is stored encrypted with a second encryption key, wherein, at each point in time during normal operation of the processing device, either the first or the second addressable storage region is selected as active and the corresponding other addressable storage region as inactive.

2. A method according to claim 1, wherein the digital data stored in the first addressable storage region encrypted with a first encryption key is encrypted by scrambling the digital data with a scrambling key derived from the first encryption key, and wherein the digital data stored in the second addressable storage region encrypted with a second encryption key is encrypted by scrambling the digital data with a scrambling key derived from the second encryption key.

3. A method according to claim 1, wherein the digital data stored in the first addressable storage region encrypted with a first encryption key is encrypted by encrypting each unit of the digital data using an encryption key determined from the first encryption key and an address of the unit of digital data in the first addressable storage region, and wherein the digital data stored in the second addressable storage region encrypted with a second encryption key is encrypted by encrypting each unit of the digital data using an encryption key determined from the second encryption key and an address of the unit of digital data in the second addressable storage region.

4. A method according to claim 1, comprising providing a memory management unit comprising an addressable region that is selectively mappable to either the first or the second addressable storage region.

5. A method according to claim 1, wherein each of the first and second encryption key is determined by a random-number generator.

6. A method according to claim 1, wherein, at each point in time during normal operation of the processing device, either the first or the second addressable storage region is selected as active and the corresponding other addressable storage region as inactive; and where the method comprises, responsive to a trigger event, performing the following steps:
   determining a new random encryption key for the inactive addressable storage region;
   halting execution of processes executed on the processing device dependent on the digital data;
   copying the digital data from the active to the inactive addressable storage region;
   causing the selector means to indicate the inactive addressable storage region as being active and the active addressable storage region as being inactive; and
   resuming execution of processes executed on the processing device dependent on the digital data.

7. A method according to claim 1, wherein, at each point in time during normal operation of the processing device, either the first or the second addressable storage region is selected as active and the corresponding other addressable storage region as inactive; and wherein the method comprises, responsive to a trigger event, performing the following steps:
   causing read commands to read data from the active addressable storage region;
   determining a new random encryption key for the inactive addressable storage region;
   copying the digital data from the active to the inactive addressable storage region; and
   causing the selector means to indicate the inactive addressable storage region as being active and the active addressable storage region as being inactive.

8. A method according to claim 7, further comprising, at least responsive to the trigger event, mirroring write commands to both the first and the second addressable storage regions.

9. A method according to claim 1, further comprising allowing access to the first and a second addressable storage region only by one or more authorized hardware components.

10. A method according to claim 1, comprising providing a third addressable storage region and storing static data in the third addressable storage medium; wherein the static digital data stored in the third addressable storage region is stored encrypted with a third encryption key; and wherein the digital data stored in the first and second addressable storage regions is dynamic data.

11. The method according to claim 1, wherein, responsive to a trigger event, performing the following steps:
   determining a new random encryption key for the inactive addressable storage region; and
   halting execution of processes executed on the processing device dependent on the digital data.

12. The method according to claim 1, wherein, responsive to a trigger event, performing the following steps:
   causing read commands to read data from the active addressable storage region; and
   determining a new random encryption key for the inactive addressable storage region.

13. A processing device adapted to provide access to digital data stored in a storage medium, the processing device comprising a processing unit adapted to:
   selectively indicate one of a first and a second addressable storage region of a storage medium as active and to;
   store the digital data in the first addressable storage region of the storage medium, wherein the digital data is stored encrypted with a first encryption key; and to cause a selector means to indicate the first addressable storage region as being active;
   wherein the processing unit is further adapted, responsive to a trigger event, to cause the selector means to indicate the first addressable storage region as being inactive and the second addressable storage region as being active; to cause the digital data stored in the first addressable storage region to be decrypted with the first encryption key; and to copy all the decrypted digital data from the first to the second addressable storage region, wherein the digital data is stored in the second addressable storage region encrypted with a second encryption key; and wherein, at each point in time during normal operation of the processing device, either the first or the second addressable storage region is selected as active and the corresponding other addressable storage region as inactive.

14. A processing device according to claim 13, wherein the processing device comprises a cipher block, an access control enforcement block, and an address translation block, wherein the cipher block is adapted to encrypt data to be written to the storage medium with a selected one of the first and second encryption key and to decrypt data read from the storage medium with a selected one of the first and second encryption key, wherein the access control enforcement block is adapted to control access to the first and second addressable storage regions, and wherein the address translation block is adapted to selectively direct commands for accessing the digital data to the active addressable storage region.

15. A processing device according to claim 13, wherein the storage medium is a DDR memory.

16. A processing device according to claim 13, wherein the processing device is a mobile terminal.

17. A processing device according to claim 13, wherein the processing device comprises a memory subsystem, a central processing unit, and the storage medium, and an address translation block, wherein the memory subsystem comprises a cipher block and an access control enforcement block, wherein the cipher block is adapted to encrypt data to be written to the storage medium with a selected one of the first and second encryption key and to decrypt data read from the storage medium with a selected one of the first and second encryption key, wherein the access control enforcement block is adapted to control access to the first and second addressable storage regions, and wherein the address translation block is adapted to selectively direct commands for accessing the digital data to the active addressable storage region.

18. A processing device according to claim 13, wherein the processing device is a programmable microprocessor.

19. A non-transitory computer-readable medium comprising program code means adapted to perform the method according to claim 1, when said program code means are executed on a data processing device.

* * * * *